Figure 1:
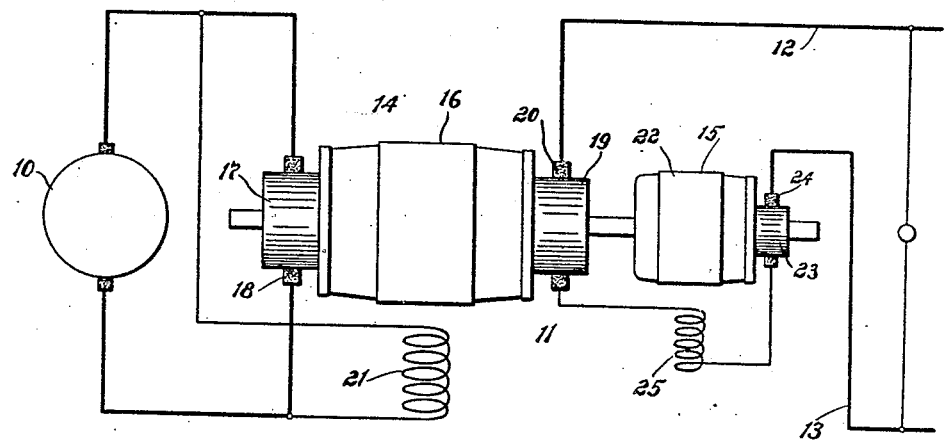

No. 850,217. PATENTED APR. 16, 1907.
B. FRANKENFIELD.
SYSTEM OF DISTRIBUTION.
APPLICATION FILED MAR. 17, 1906.

2 SHEETS—SHEET 1.

WITNESSES:
George J. Schwartz
Fred J. Kinsey

INVENTOR:
Budd Frankenfield.
By
Chas. E. Lord
ATTORNEY.

No. 850,217.
PATENTED APR. 16, 1907.
B. FRANKENFIELD.
SYSTEM OF DISTRIBUTION.
APPLICATION FILED MAR. 17, 1906.
2 SHEETS—SHEET 2.
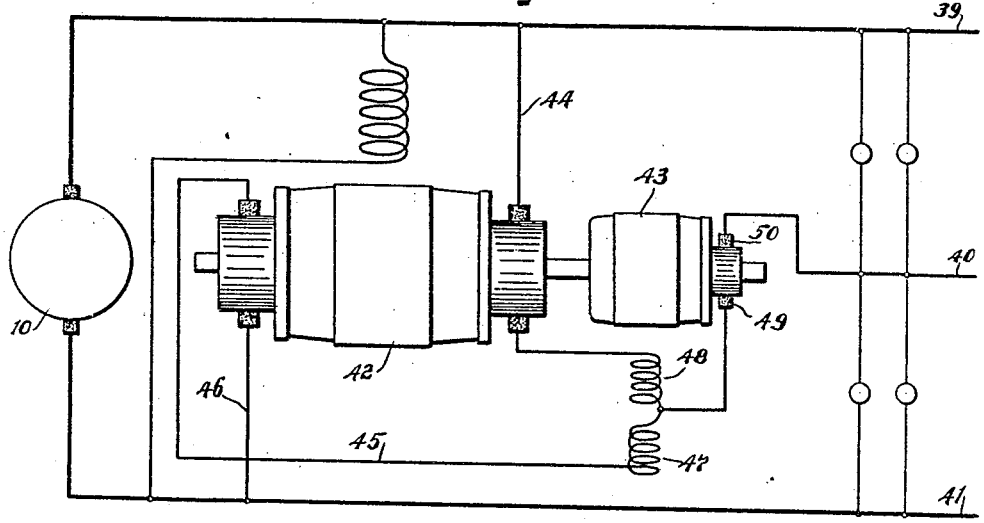
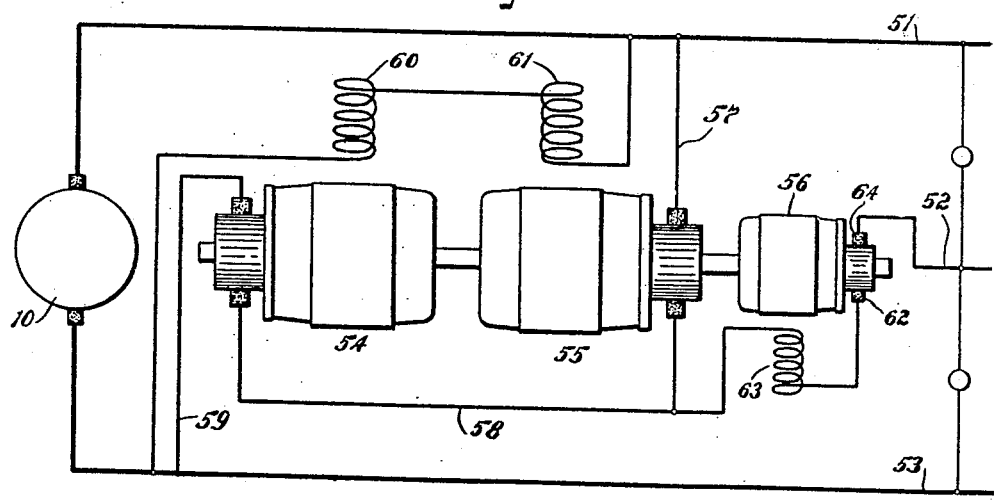
WITNESSES:
George J. Schwartz
Fred J. Kinsey
INVENTOR:
Budd Frankenfield.
By
Chas. E. Lord
ATTORNEY.

UNITED STATES PATENT OFFICE.

BUDD FRANKENFIELD, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

SYSTEM OF DISTRIBUTION.

No. 850,217.     Specification of Letters Patent.     Patented April 16, 1907.

Application filed March 17, 1906. Serial No. 306,573.

*To all whom it may concern:*

Be it known that I, BUDD FRANKENFIELD, a citizen of the United States, residing at Norwood, in the county of Hamilton and State of Ohio, have invented certain new and useful Improvements in Systems of Distribution, of which the following is a full, clear, and exact specification.

My invention relates to systems of distribution in which dynamo-electric-machine units are employed for transforming purposes, and especially to the novel means whereby such units can be compounded to supply the proper voltage to the translating devices under any conditions of load.

Dynamo-electric-machine units with motor and generator windings, such as dynamotors and motor-generators having shunt characteristics, are frequently used in transforming power. The dynamotor, as is well known, has but one magnetic field and two armatures or two armature-windings on the same core. The motor-generator, on the other hand, has two separate armatures located in independent magnetic fields. Although the dynamotor has several distinct advantages over the motor-generator its field of application is somewhat limited, for the reason that shunt characteristics only are obtainable. Compounding effects cannot be obtained from a dynamotor by adding series windings in the customary manner, for the reason that the effect of the series field upon the motor-armature winding would neutralize the effect upon the generator-armature winding. In other words, the effect of the series windings would be to change the speed of the unit without changing the generated voltage.

Since in a motor-generator unit the motor and generator fields are separate, the field of the generator can be provided with series windings, and compound characteristics can be obtained as long as the series-wound machine acts as a generator and the other machine acts as a motor. It follows that such a unit could not be employed in case the motor and generator relation of the two machines was intended to be reversed, for the reason that on reversal the series-wound generator would become a differential motor and the unit would be in danger of running away or of racing, especially on overload. Therefore motor-generators employed as balancers in multiple-voltage systems are usually shunt-wound, and accordingly close voltage regulation is impossible.

The object of my invention is to provide means whereby the dynamo-electric-machine units having motor and generator windings, such as dynamotors and motor-generators employed for transforming purposes, can be compounded and in such a manner that no matter for what purposes the units are employed there will be no danger of racing on overload.

My invention consists in certain novel combinations and arrangements of parts described in the specification, and set forth in the appended claims.

For a better understanding of my invention reference is had to the accompanying drawings, in which—

Figure 2:
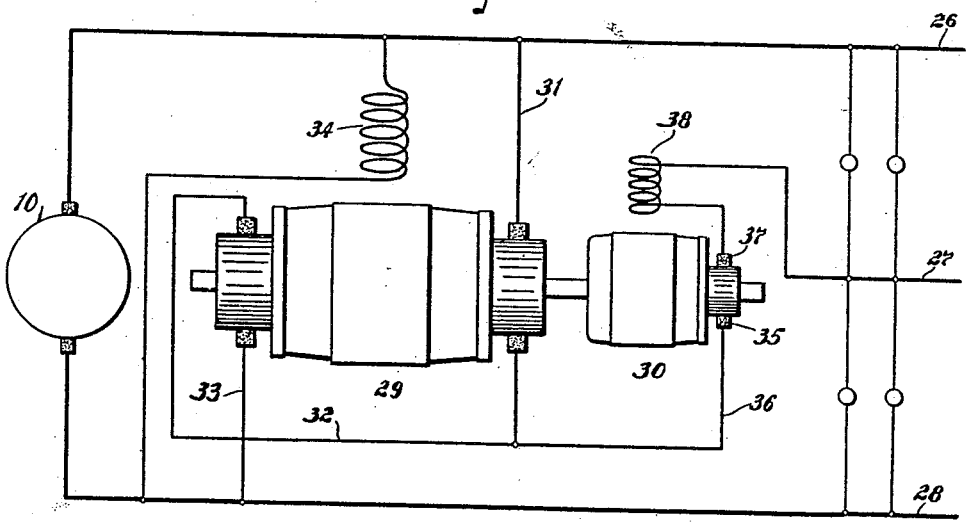

Figure 1 is a diagram of a two-wire single-voltage system of distribution in which a dynamotor compounded in accordance with my invention is employed. Fig. 2 is a diagram of a three-wire multiple-voltage system of distribution provided with a dynamotor-balancer compounded according to my invention. Fig. 3 is a diagram of a three-wire multiple-voltage system, showing a dynamotor-balancer compounded in a slightly-different manner; and Fig. 4 is a diagram of a three-wire multiple-voltage system in which a motor-generator balancer compounded according to my invention is employed.

At 10 in Fig. 1 is shown a main source of current—in this case a generator—and at 11 a dynamo-electric-machine unit adapted to receive current from said generator at a certain voltage and to supply current to the feeder-conductors 12 and 13 at a different voltage. The unit in this case consists of a shunt-wound dynamotor 14 and a small auxiliary series generator 15, the purpose of which will be explained later. The dynamotor has a single armature-core 16, adapted to carry the motor and generator armature windings. (Not shown.) At 17 is shown the motor-commutator and at 18 the motor-brushes, by which current is supplied to the motor-armature winding from the main source of current 10. At 19 at the opposite end of the dynamotor is shown a second commutator adapted to be connected to the generator-armature winding and at 20 the generator-brushes by means of which current is supplied to feeder-conductors 12 and 13. At 21 is shown a shunt field-winding of the dynamotor, which winding is also connected to the source of current 10. The machine so far described is the ordinary dynamotor. This machine is well adapted for transforming power when compound characteristics are unnecessary.

Heretofore dynamotors supplied from a source of constant voltage could not be used for transforming purposes in case it was necessary to supply to the translating devices variable current at constant voltage. Since in a dynamotor sparking is almost negligible, for the reason that the motor-armature reaction is almost entirely neutralized by the generator-armature reaction, and since such a machine is lighter and cheaper and the friction, field resistance, and core losses are less than in other apparatus used for this purpose, as a motor-generator, it is highly desirable to provide means whereby the dynamotor can be compounded in order that its field of application may be enlarged. I accomplish this result by employing in connection with the dynamotor a small auxiliary generator 15, having series characteristics and so connected to the generator-winding of the dynamotor that the two generator voltages are in series and addative. As is shown, the generator 15 is mounted to rotate with the dynamotor. The generator 15 is provided with an armature 22, commutator 23, brushes 24, and series field-winding 25. The armature-winding and field-winding are connected in series with the generator-armature winding of the dynamotor. The series field 25 can be adjusted to provide for any degree of compounding or overcompounding. The purpose of this generator is simply to supply the extra voltage necessary to compensate for an increased voltage drop in the generator-armature winding and feeder-conductors when the load increases. Very little work is required of the generator 15, and therefore it can be small and inexpensive and can be easily designed so that there is little or no sparking.

In Fig. 2 the dynamotor, compounded as in the preceding case, is employed as a balancer in a multiple-voltage system. The feeder-conductors of the multiple-voltage system are shown at 26, 27, and 28. The system may have either symmetrical or unsymmetrical voltages. The compounded unit consists, as in the preceding case, of a dynamotor 29 and a small series auxiliary generator 30. The armature-windings of the dynamotor are connected in series across the main conductors 26 and 28 by conductors 31, 32, and 33. The dynamotor is provided with a shunt field-winding 34, also connected across the conductors 26 and 28. One of the brushes 35 of the auxiliary generator is connected by conductor 36 to the conductor 32, joining the armature-windings of the dynamotor. The other brush 37 is connected to the series field-winging 38 and to conductor 27. It is seen that if the loads are balanced there is no current passing through conductor 27 and series field-winding 38, and therefore no voltage is supplied by the auxiliary generator 30. In case, however, the loads are unbalanced the auxiliary generator 30 supples voltage to one side of the system or the other, depending upon the direction of the current-flow through the conductor 27 and series field-winding 38. By means of the voltage supplied by the auxiliary generator the voltage between any two conductors can be maintained substantially at the proper predetermined value, even if the loads are greatly unbalanced. It is evident that this same principle can be applied to a multiple-voltage system of distribution having more than three conductors.

Reference is now had to Fig. 3, which shows a multiple-voltage system and a balancer consisting of a dynamotor compounded in a manner slightly different from that shown in Fig. 2. The conductors of the multiple-voltage system are shown at 39, 40, and 41. The balancer consists of a dynamotor 42 and an auxiliary generator 43. The armature-windings of the dynamo or are connected by conductors 44, 45, and 46 between the conductors 39 and 41 of the multiple-voltage system, as in the preceding case. Included in the conductor 45 are two oppositely-wound series field-windings 47 and 48 for the auxiliary generator 43 of the dynamo-electric-machine unit. The brushes 49 and 50 of the auxiliary generator are connected, respectively, to conductor 45 at a point between these two oppositely-wound series field-windings and to the neutral or compensating conductor 40. It is seen that when the loads are balanced and no current is flowing in the conductor 40 that the currents passing through the two series field-windings 47 and 48 are equal. Therefore the effect of one winding exactly neutralizes the effect of the other winding and the generator 43 supplies no voltage to the conductors of the system. In case, however, the loads become unbalanced more current passes through one of the field-windings than the other for the reason that more current passes to the motor-armature winding than to the generator-armature winding, since the motor must supply the losses of both machines. The excess of current in the one winding over the current in the other depends upon the losses in the two machines and varies with the load in such a manner that the voltage supplied by the auxiliary generator varies substantially with the degree of unbalancing. There are only slight differences of potential between field-winding 47, field-winding 48, and the armature-winding of the auxiliary generator, and hence little danger of a breakdown in the insulation.

Motor-generator sets are frequently employed for balancing purposes in multiple-voltage systems. As in the cases before described, it is highly desirable that the balancers be compounded in order that the differences in voltage between the various conductors may be maintained practically constant. For the same reason that a differential motor is liable to run away on overload a balancer compounded in the ordinary manner is liable to run away or race when the loads are unbalanced. A motor-generator balancer compounded according to my invention has no tendency to race or run away. In Fig. 4 is shown a balancer unit consisting of a motor-generator set and an auxiliary generator for compounding purposes. The conductors of the multiple-voltage system are shown at 51, 52, and 53. The two main dynamo-electric machines of the motor-generator are shown at 54 and 55 and the auxiliary generator is shown at 56. The armature-windings of machines 54 and 55 are connected across the conductors 51 and 53 by conductors 57, 58, and 59 in the usual manner. The machines are provided with shunt field-windings 60 and 61. Brush 62 of the auxiliary generator is in this case connected to series winding 63 and to conductor 58, and brush 64 is connected directly to the neutral or compensating conductor 52. The operation of the compounded motor-generator is precisely the same as that of the compounded dynamotor in Fig. 2. When the loads are balanced, no current passes through the series winding 63 of the auxiliary generator, and hence the latter supplies no voltage to either side of the system. In case, however, the loads become unbalanced current flows through the compensating conductor 52 and through the main machines of the balancer, one of said machines acting as a motor and the other acting as a generator to supply the balancing voltage. Voltage is now also supplied by the auxiliary generator to one side or the other of the system, depending upon which side is the more heavily loaded, and the auxiliary generator is so connected that the direction of current in the compensating conductor magnetizes the field of the auxiliary generator in a direction such that the voltage developed is in series and is added to that of the main machine of the balancer, which is acting as a generator. Thus the voltages are maintained practically at their predetermined values. It is seen that the motor-generator compounded in this manner cannot race or run away no matter what the degree of unbalancing is, for the reason that the series magnetic circuit is separate from both the other circuits, and hence the main dynamo-electric machine of the balancer, which is acting as a motor, can never have differential fields.

I do not desire to be confined to the exact details shown, as many changes could be made without departing from the spirit and scope of my invention.

What I claim as new, and desire to secure by Letters Patent, is—

1. In combination, a dynamo-electric-machine unit having motor and generator armature windings, a field-winding, an auxiliary generator-armature winding, and a separate field-winding therefor, said two field-windings producing shunt and series magnetic effects.

2. In combination, a dynamo-electric-machine unit comprising motor and generator armature windings having shunt field excitation, and an auxiliary generator-winding in series with the first-mentioned generator-winding and having series field excitation whereby the unit has a compound characteristic.

3. In combination, a dynamo-electric-machine unit having main motor and generator armature windings having shunt field excitation, and an auxiliary generator comprising an armature and a separate magnetic field, the winding of said auxiliary generator-armature being connected to the main generator-armature winding and having a field excitation depending on load conditions.

4. In a system of distribution, a main source of current, feeder-conductors, a dynamo-electric-machine unit connected to said source of current, and adapted to supply current to said feeder-conductors, said unit having main motor and generator armature windings having substantially constant field excitation, and an auxiliary generator comprising an armature-winding and one or more field-windings for producing a field excitation which varies substantially with the load conditions.

5. In a system of distribution, a main source of current and supply-circuit, feeder-conductors, a dynamo-electric-machine unit having three separate armature-windings, one of said windings being connected to the source of current and the other two being connected to the feeder-conductors and adapted to supply current thereto, and means for creating independent fields for said two last-named windings, one of said fields varying with the pressure of the main supply-circuit and the other varying with the current flowing in a feeder-conductor.

6. In a system of distribution, a main source of current-supply, feeder-conductors, a dynamo-electric-machine unit comprising two main armature-windings, one or more shunt field-windings therefor, and an auxiliary compounding-generator having an armature-winding and one or more field-windings for creating a magnetic field which varies with load conditions.

7. In a system of distribution, a main source of current-supply, feeder-conductors, a dynamo-electric-machine unit comprising two main armature-windings and one or more shunt field-windings, one of said armature-windings being adapted to receive current from said source of supply and the other being adapted to supply current to the feeder-conductors, and an auxiliary armature-winding located in a magnetic field which varies substantially with the current in a feeder-conductor.

8. In a system of distribution, a main source of current-supply, feeder-conductors, a dynamo-electric-machine unit comprising two armature-windings and one or more shunt field-windings, and a separate generator having a series field-winding and an armature-winding in series with one of the other windings.

9. In a system of distribution, a main source of current, feeder-conductors, and a dynamo-electric-machine unit adapted to receive current from said main source and to supply current to the feeder-conductors, said unit comprising a motor-armature winding and a generator-armature winding having shunt field excitation, and an auxiliary generator-armature winding having series excitation, the two generator-armature windings being in series.

10. In a system of distribution, a main source of current, a plurality of feeder-conductors, a dynamo-electric-machine unit adapted to receive current from said main source and to supply current to the feeder-conductors, said unit comprising two main armature-windings and one or more shunt field-windings, and an auxiliary generator having an armature-winding and a field-winding adapted to be connected in series with one of the main armature-windings and with one of the feeder-conductors.

In testimony whereof I affix my signature in the presence of two witnesses.

BUDD FRANKENFIELD.

Witnesses:
ARTHUR F. KWIS,
FRED J. KINSEY.